(12) United States Patent
Jia (10) Patent No.: US 10,440,172 B2
(45) Date of Patent: Oct. 8, 2019

(54) TERMINAL-DEVICE CONTROL METHOD AND SYSTEM, AND MOBILE TERMINAL

(71) Applicant: ZTE CORPORATION, Guangdong (CN)

(72) Inventor: Xin Jia, Guangdong (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 0 days.

(21) Appl. No.: 16/085,494

(22) PCT Filed: Jun. 15, 2016

(86) PCT No.: PCT/CN2016/085893
§ 371 (c)(1),
(2) Date: Sep. 14, 2018

(87) PCT Pub. No.: WO2017/156903
PCT Pub. Date: Sep. 21, 2017

(65) Prior Publication Data
US 2019/0166246 A1 May 30, 2019

(30) Foreign Application Priority Data
Mar. 14, 2016 (CN) .............................. 201610144576

(51) Int. Cl.
*H04M 1/72* (2006.01)
*H04M 1/725* (2006.01)
*H04W 4/02* (2018.01)

(52) U.S. Cl.
CPC ....... *H04M 1/72569* (2013.01); *H04M 1/725* (2013.01); *H04W 4/023* (2013.01)

(58) Field of Classification Search
CPC ........................... H04M 1/72569; H04W 4/023
See application file for complete search history.

(56) References Cited

U.S. PATENT DOCUMENTS

| 2010/0240320 A1* | 9/2010 | Kohno ................ H04L 1/0014 455/68 |
| 2014/0064116 A1* | 3/2014 | Linde .................. H04W 4/021 370/252 |

(Continued)

FOREIGN PATENT DOCUMENTS

| CN | 104506707 A | 4/2015 |
| CN | 204290930 U | 4/2015 |

(Continued)

OTHER PUBLICATIONS

International Search Report dated Dec. 5, 2016 for International Application No. PCT/CN2016/085893, 5 pages.

(Continued)

*Primary Examiner* — Pakee Fang
(74) *Attorney, Agent, or Firm* — Knobbe Martens Olson & Bear LLP (57) ABSTRACT

Provided is a terminal-device control method. The method includes: detecting a magnetic interference signal emitted by at least one wearable device; determining a magnetic interference variation caused by the at least one wearable device to a mobile terminal according to the magnetic interference signal; determining a positional relationship between the mobile terminal and the at least one wearable device according to the magnetic interference variation caused by the at least one wearable device to the mobile terminal; determining an operation instruction for the mobile terminal according to the positional relationship; and controlling, based on the operation instruction, the mobile terminal to execute a corresponding operation.

12 Claims, 6 Drawing Sheets

(56) References Cited

U.S. PATENT DOCUMENTS

| | | | |
|---|---|---|---|
| 2014/0327515 A1* | 11/2014 | Luna | H04R 3/00 |
| | | | 340/4.42 |
| 2015/0148066 A1* | 5/2015 | Gilberton | H04W 4/023 |
| | | | 455/456.1 |
| 2015/0369921 A1 | 12/2015 | Lee | |
| 2016/0036953 A1 | 2/2016 | Lee et al. | |
| 2016/0036965 A1 | 2/2016 | Kim | |
| 2017/0127250 A1* | 5/2017 | Zhou | H04W 4/02 |
| 2017/0374525 A1* | 12/2017 | Abadi | H04W 4/33 |

FOREIGN PATENT DOCUMENTS

| | | |
|---|---|---|
| CN | 105323379 A | 2/2016 |
| CN | 105323380 A | 2/2016 |
| JP | 2016024718 A1 | 2/2016 |

OTHER PUBLICATIONS

Written Opinion of the International Searching Authority dated Dec. 5, 2016 for International Application No. PCT/CN2016/085893, 6 pages.

* cited by examiner

Figure 8 ical FIELD

TERMINAL-DEVICE CONTROL METHOD AND SYSTEM, AND MOBILE TERMINAL

CROSS REFERENCE TO RELATED APPLICATIONS

This is a U.S. National Stage Application, filed under 35 U.S.C. 371, of International Patent Application No. PCT/CN2016/085893, filed on Jun. 15, 2016, which claims priority to Chinese patent application No. 201610144576.4 filed on Mar. 14, 2016, contents of both of which are incorporated herein by reference in their entireties.

TECHNICAL FIELD

The present disclosure relates to, but is not limited to, an interactive technology in the communication field and, in particular, to a terminal-device control method, a mobile terminal and a system.

BACKGROUND

At present, users operate the mobile terminal (such as a smart phone) mainly by touching the mobile terminal to open corresponding applications. The users need to pick up the mobile terminal and then perform certain operations on the mobile terminal to execute functions, such as pressing a series of buttons of the mobile terminal. The users need an operation mode that is both safe and easy to operate. The operation mode should be natural and not require too many user interventions. In addition, wearable devices such as a smart bracelet, a smart watch or other accessories are maturing, and are becoming more and more popular among many people. Wearable devices coordinating with smart phones can bring new and practical experience. However, the smart bracelet or the smart watch is often limited to a single function, such as detecting physiological indicators and then sending information to the smart phone, or controlling music play of the phone, or performing an electronic fence function. It can be seen that there is fewer interactions between the mobile terminal and the wearable device, and the operation of the mobile terminal still requires a lot of consumer interventions.

SUMMARY

The following is a summary of the subject matter described in detail in the present disclosure. This summary is not intended to limit the scope of the claims.

A terminal-device control method, a mobile terminal and a system provided by embodiments of the present disclosure may at least address the problem in the related art that the mobile terminal operation requires more user interventions.

A terminal-device control method provided by the embodiments of the present disclosure includes: detecting a magnetic interference signal emitted by at least one wearable device, and determining, according to the magnetic interference signal, a magnetic interference variation caused by the at least one wearable device to a mobile terminal; determining, according to the magnetic interference variation caused by the at least one wearable device to the mobile terminal, a positional relationship between the mobile terminal and the at least one wearable device; determining, according to the positional relationship, an operation instruction for the mobile terminal; and controlling, based on the operation instruction, the mobile terminal to execute a corresponding operation.

In the above-mentioned solution, the determining, according to the positional relationship, the operation instruction for the mobile terminal includes:

selecting, according to the positional relationship between the mobile terminal and the at least one wearable device, a preset condition from a preset strategy, and determining a corresponding operation instruction based on the preset condition. The preset strategy includes at least one preset condition, and an operation instruction corresponding to each preset condition. When the at least one preset condition at least includes the operation instruction corresponding to a triggering, a distance between the mobile terminal and the at least one wearable device is within a preset distance range.

In the above-mentioned solution, the selecting, according to the positional relationship between the mobile terminal and the at least one wearable device, the preset condition from the preset strategy, and determining the corresponding operation instruction based on the preset condition includes:

determining, based on a first preset condition, a corresponding first operation instruction when the positional relationship between the mobile terminal and the at least one wearable device satisfies a first preset distance range;

determining, based on a second preset condition, a corresponding second operation instruction when the positional relationship between the mobile terminal and the at least one wearable device satisfies a second preset distance range.

A range value corresponding to the first preset distance range and a range value corresponding to the second preset distance range are different, the first preset condition and the second preset condition are different, and the first operation instruction and the second operation instruction are different.

In the above-mentioned solution, the at least one wearable device includes a first wearable device and a second wearable device.

The selecting, according to the positional relationship between the mobile terminal and the at least one wearable device, the preset condition from the preset strategy, and determining the corresponding operation instruction based on the preset condition includes:

determining that the positional relationship between the mobile terminal and the at least one wearable device satisfies a third preset condition, when the mobile terminal is in a first operation state, a positional relationship between the mobile terminal and the first wearable device maintains unchanged, and a positional relationship between the mobile terminal and the second wearable device satisfies a third preset distance range; and determining, based on the third preset condition, a corresponding third operation instruction; wherein the third operation instruction is used for controlling the mobile terminal to switch from the first operation state to a second operation state.

In the above-mentioned solution, the determining, according to the positional relationship, the operation instruction for the mobile terminal includes: determining, based on the positional relationship, a motion track of the at least one wearable device relative to the mobile terminal; and selecting, based on the motion track, a corresponding operation instruction.

In the above-mentioned solution, the detecting the magnetic interference signal emitted by the at least one wearable device includes: detecting a magnetic interference signal matching a preset pulse form emitted by the at least one wearable device.

A mobile terminal provided by the embodiment of the present disclosure includes:

a detection unit, which is configured to detect a magnetic interference signal emitted by at least one wearable device, and determine, according to the magnetic interference signal, a magnetic interference variation caused by the at least one wearable device to a mobile terminal; determine, according to the magnetic interference variation caused by the at least one wearable device to the mobile terminal, a positional relationship between the mobile terminal and the at least one wearable device;

a preset strategy processing unit, which is configured to determine, according to the positional relationship, an operation instruction for the mobile terminal; and an operation execution unit, which is configured to control, based on the operation instruction, the mobile terminal to execute a corresponding operation.

In the above-mentioned solution, the preset strategy processing unit is configured to select, according to the positional relationship between the mobile terminal and the at least one wearable device, a preset condition from a preset strategy, and determine a corresponding operation instruction based on the preset condition.

The preset strategy includes at least one preset condition and an operation instruction corresponding to each preset condition. When the at least one preset condition at least includes the operation instruction corresponding to a triggering, a distance between the mobile terminal and the at least one wearable device is within a preset distance range.

In the above-mentioned solution, the preset strategy processing unit is configured to determine, based on a first preset condition, a corresponding first operation instruction when the positional relationship between the mobile terminal and the at least one wearable device satisfies a first preset distance range; and determine, based on a second preset condition, a corresponding second operation instruction when the positional relationship between the mobile terminal and the at least one wearable device satisfies a second preset distance range.

A range value corresponding to the first preset distance range and a range value corresponding to the second preset distance range are different. The first preset condition and the second preset condition are different. The first operation instruction and the second operation instruction are different.

In the above-mentioned solution, the preset strategy processing unit is configured to determine that the positional relationship between the mobile terminal and the at least one wearable device satisfies a third preset condition, when the mobile terminal is in a first operation state, a positional relationship between the mobile terminal and the first wearable device maintains unchanged, and a positional relationship between the mobile terminal and the second wearable device satisfies a third preset distance range; and determine a corresponding third operation instruction based on the third preset condition.

The third operation instruction is used for controlling the mobile terminal to switch from the first operation state to a second operation state.

In the above-mentioned solution, the preset strategy processing unit is configured to determine, based on the positional relationship, a motion track of the at least one wearable device relative to the mobile terminal; and select, based on the motion track, a corresponding operation instruction.

In the above-mentioned solution, the detection unit is configured to detect a magnetic interference signal matching a preset pulse form emitted by the at least one wearable device.

A terminal-device control system provided by the embodiment of the present disclosure includes: a mobile terminal and at least one wearable device.

The at least one wearable device is configured to emit a magnetic interference signal.

The mobile terminal is configured to detect the magnetic interference signal emitted by the at least one wearable device, and determine, according to the magnetic interference signal, a magnetic interference variation caused by the at least one wearable device to a mobile terminal; determine, according to the magnetic interference variation caused by the at least one wearable device to the mobile terminal, a positional relationship between the mobile terminal and the at least one wearable device; determine, according to the positional relationship, an operation instruction for the mobile terminal; and control, based on the operation instruction, the mobile terminal to execute a corresponding operation.

In the above-mentioned solution, the at least one wearable device further includes:

a magnetic intensity configuration unit, which is configured to configure an intensity of the magnetic interference signal; and a magnetic induction device, which is configured to emit a magnetic interference signal in a preset pulse form based on the intensity of the magnetic interference signal.

In the above-mentioned solution, the mobile terminal further includes:

a detection unit, which is configured to detect the magnetic interference signal emitted by the at least one wearable device, and determine, according to the magnetic interference signal, the magnetic interference variation caused by the at least one wearable device to the mobile terminal; determine, according to the magnetic interference variation caused by the at least one wearable device to the mobile terminal, the positional relationship between the mobile terminal and the at least one wearable device;

a preset strategy processing unit, which is configured to determine, according to the positional relationship, the operation instruction for the mobile terminal; and an operation execution unit, which is configured to control, based on the operation instruction, the mobile terminal to execute the corresponding operation.

An embodiment of the present disclosure further provides a computer-readable storage medium configured to store computer-executable instructions for implementing the above-mentioned terminal-device method when executed.

According to the terminal-device control method, mobile terminal and system provided by the embodiments of the present disclosure, the magnetic interference signal emitted by the at least one wearable device is detected; the positional relationship between the mobile terminal and the at least one wearable device is determined based on the magnetic interference variation corresponding to the magnetic interference signal; the preset condition is selected from the preset strategy according to the positional relationship, and the operation instruction is determined based on the preset condition, and finally the mobile terminal is controlled based on the operation instruction to execute the corresponding operation. In this way, the mobile terminal operation is more intelligent, the number of manual click operations of the users is reduced, and usage experience of the users is improved.

Other aspects can be understood after the accompanying drawings and detailed description are read and understood.

DETAILED DESCRIPTION

The present disclosure will be further described in detail with reference to the accompanying drawings and specific embodiments.

First Embodiment

Figure 1:
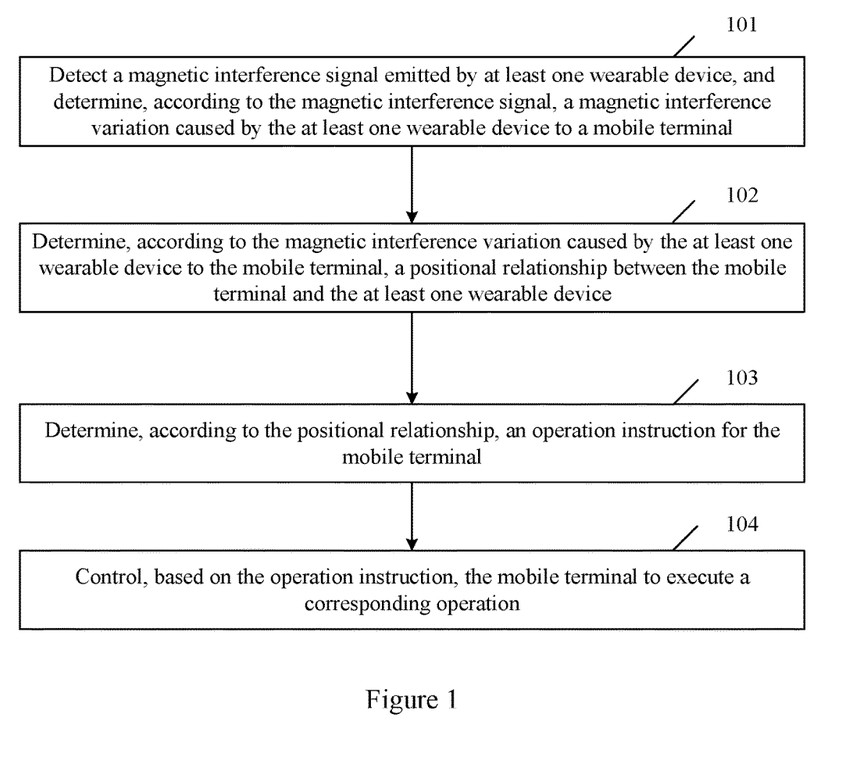
FIG. 1 is a first flowchart of a terminal-device control method according to an embodiment of the present disclosure.

This embodiment of the present disclosure provides a terminal-device control method. As shown in FIG. 1, the method of this embodiment includes steps describe below.

In step 101: a magnetic interference signal emitted by at least one wearable device is detected. According to the magnetic interference signal, a magnetic interference variation caused by the at least one wearable device to a mobile terminal is determined.

In step 102: according to the magnetic interference variation caused by the at least one wearable device to the mobile terminal, a positional relationship between the mobile terminal and the at least one wearable device is determined.

In step 103: according to the positional relationship, an operation instruction for the mobile terminal is determined.

In step 104: according to the operation instruction, the mobile terminal is controlled to execute a corresponding operation.

The mobile terminal in this embodiment of the present disclosure, such as a smart phone, has a function of a geomagnetic sensor. The geomagnetic sensor can sense the magnetic field of Earth. The mobile terminal detects whether a magnetic interference change brought by the wearable device satisfies a predefined triggering condition and detects whether the positional relationship between the mobile terminal and the wearable device matches a preset strategy by the geomagnetic sensor. If the positional relationship matches the preset strategy, the mobile terminal executes a predefined operation to improve the user experience.

The working principle of the geomagnetic sensor is to determine the geomagnetic change by using tiny anisotropic magnetoresistive materials, and to indicate the posture and motion angle of the object being tested by sensing the distribution changes of the geomagnetic field. The anisotropic magnetoresistive materials may generate large resistance changes in response to very weak magnetic field changes. Using the geomagnetic sensor of a smart phone, using an induced magnetic field, by a built-in magnetic induction device in the wearable device, by changing the positional relationship between the wearable device and the mobile terminal, the magnetic field sensed by the geomagnetic sensor of the mobile terminal is correspondingly changed, so that a change value of a magnetic flux reaches a set threshold value, and the corresponding predefined function is triggered.

The step in which the magnetic interference signal emitted by the at least one wearable device is detected may include: determining a magnetic interference signal matching a preset pulse form emitted by the at least one wearable device. For example, the mobile terminal may detect, by a built-in geomagnetic sensor, the magnetic interference signal in a preset pulse form emitted by the at least one wearable device. The geomagnetic sensor may be a hall sensor, a magneto-resistive sensor, an electromagnetic sensor, Anisotropic Magneto-Resistive sensors (AMR) and a Giant Magneto Resistance (GMR) sensor, etc., and used in cooperation with a magnetic piece device of the wearable device.

The preset pulse form may be configured according to the actual situation. For example, the preset pulse form may be the occurrence frequency of an interference magnetic field. That is, the mobile terminal detects whether the interference magnetic field that is in the preset pulse form and produced by the wearable device satisfies the occurrence frequency configured in the preset strategy. The mobile terminal detects the occurrence frequency of the interference magnetic field of the wearable device by using the geomagnetic sensor. When the occurrence frequency of the interference magnetic field of the wearable device satisfies a certain condition, the subsequent steps are performed. The occurrence frequency may be reconfigured according to requirements of the users. The occurrence frequency of the interference magnetic field of the wearable device may be controlled by an on-off frequency of a current of the wearable device.

In addition, a built-in magnetic induction triggering device is provided in the wearable device in this embodiment and includes magnetic pieces, each of which is an independent magnetic piece device, or is embedded in the wearable device, such as a ring or a watch strap, and generates the magnetic interference signal of an unique intensity. Different interference magnetic fields exist depending on the size, thickness and shape of the magnetic pieces. The intensity of the magnetic interference signal of the magnetic induction triggering device may also be controlled by a current of the wearable device. By a principle that a magnetic field is generated by changing the magnetoelectricity field, the magnetic field is generated by the current.

A calculation method of the step, in which the positional relationship between the mobile terminal and the at least one wearable device is determined according to the magnetic interference variation caused by the at least one wearable device to the mobile terminal, is described below. In a preset cycle, near magnetic interferences in different locations and directions bring different changes of the geomagnetic sensor of the mobile terminal. The change data is saved in real time. Data obtained by detecting is converted into sensed data which can be recognized by the mobile terminal, so that the mobile terminal may obtain the positional relationship of the mobile terminal by using the sensed data. The positional relationship of the mobile terminal in the preset cycle is acquired by the geomagnetic sensor according to a preset frequency. The preset cycle is a preset duration of the mobile terminal for acquiring sensing device data. Optionally, the preset cycle is 0.1 seconds. Motion parameters of M motion points are acquired according to a preset sampling interval, such as a direction or a coordinate value. Values to be compared may be one or more values of the direction or the coordinate value. Whether deltas of the motion parameters of M motion points or in multiple same time points are in a preset error range is determined sequentially. When comparison results are in a certain error range, the positional relationship is considered to be consistent. For example, error values with a certain range may be established at factory settings, so that the positional relationship of the mobile terminal has a certain tolerance range. As long as the range is satisfied, the positional relationship may be considered to be consistent, which can improve the intelligence degree of the mobile phone and bring good user experience.

Optionally, to guarantee the uniqueness and peculiarity of the interference magnetic field emitted by the wearable device, a rhythmic magnetic field in the pulse form may be designed. The geomagnetic sensor of the mobile terminal only recognizes the interference magnetic field in the preset pulse form to avoid being confused by other external interference magnetic fields, such as magnetic field interference of a sound horn. The interference magnetic field in the pulse form is generated by a current with a certain on-off regular.

The step in which the operation instruction for the mobile terminal is determined according to the positional relationship includes:

selecting, according to the positional relationship between the mobile terminal and the at least one wearable device, a preset condition from a preset strategy, and determining a corresponding operation instruction based on the preset condition.

The preset strategy includes at least one preset condition and an operation instruction corresponding to each preset condition. When the at least one preset condition at least includes the operation instruction corresponding to a triggering, a distance between the mobile terminal and the at least one wearable device is within a preset distance range.

The step of selecting, according to the positional relationship between the mobile terminal and the at least one wearable device, the preset condition from the preset strategy includes that: the mobile terminal detects the positional relationship of the wearable device by using the geomagnetic sensor, and when the positional relationship satisfies one preset condition in the preset strategy, the corresponding operation instruction is determined based on the preset condition. The features matching the preset strategy may be reconfigured according to requirements of the users.

The preset strategy may include the at least one preset condition and the operation instruction corresponding to the each preset condition.

Optionally, when the wearable device gets close to or away from the mobile terminal, the geomagnetic sensor of the mobile terminal deviates from a normal state due to the near magnetic interference. The near magnetic interferences in different locations and directions bring different changes of the geomagnetic sensor of the mobile terminal. An internal circuit of the mobile terminal changes, a preset circuit switch is activated, and a predefined software function is triggered. When the wearable device gets close to the mobile terminal, an predefined operation is executed. When the wearable device gets away from the mobile terminal, another predefined operation is executed. When the wearable device and the mobile terminal are located in a specific positional relationship, another predefined operation is executed.

Optionally, the positional relationship is a specific value that reflects an actual motion situation of the mobile terminal in a certain environment. The positional relationship includes speed, displacement distance and coordinate value in each motion direction of the mobile terminal per unit time. According to the positional relationship of the mobile terminal, that is the direction and the coordinate value in each time point in the preset cycle, whether a matching degree of the positional relationship of the mobile terminal is equal to the preset threshold value is determined.

The application scenarios of this embodiment include: for example, a user with a wearable device (such as a bracelet and/or a watch) picks up the mobile terminal (such as the smart phone) placed on the desk and lifts the mobile terminal to the face, the screen of the mobile terminal is lit up and unlocked automatically and immediately. The process is simple, natural and safe, without requiring any participation of the user. When the user places the mobile phone on the desk or in the pocket after using the mobile phone, the screen of the mobile phone is automatically and immediately dimmed and locked to reduce the power consumption. The process is simple, natural and safe, without requiring the user to press buttons to lock the screen. When the mobile phone of the user is moved by others, the mobile phone automatically and immediately reports a reminder to guarantee the security of the mobile phone. When the mobile phone of the user is borrowed to others, the mobile phone enters into a guest mode immediately to protect the privacy of the user.

With the above-mentioned solution, the magnetic interference signal emitted by the at least one wearable device may be detected, a corresponding preset condition is selected from the preset strategy based on the magnetic interference signal, and the operation instruction is determined based on the preset condition, and finally the mobile terminal is controlled to execute the corresponding operation based on the operation instruction. In this way, the mobile terminal operation is more intelligent, the number of manual click operations of the users is reduced, and usage experience of the users is improved Second Embodiment On the basis of the scenario provided by the first embodiment, this embodiment describes how to perform a subsequent processing based on the positional relationship when the at least one wearable device is one wearable device.

The step of selecting, according to a positional relationship between a mobile terminal and the at least one wearable device, a preset condition from a preset strategy, and determining a corresponding operation instruction based on the preset condition includes steps describe below.

A corresponding first operation instruction is determined based on a first preset condition when the positional relationship between the mobile terminal and the at least one wearable device satisfies a first preset distance range.

A corresponding second operation instruction is determined based on a second preset condition when the positional relationship between the mobile terminal and the at least one wearable device satisfies a second preset distance range.

Distance range values corresponding to the first preset distance range and the second preset distance range are different. The first preset condition and the second preset condition are different. The first operation instruction and the second operation instruction are different.

This embodiment may configure that the first preset distance range is greater than a first distance value, the second preset distance range is less than or equal to the first distance value and is greater than a second distance value. The first distance value is bigger than or equal to the second distance value. That is the first preset distance range may include all distance values greater than the first distance value. The second preset distance range may include all distance values greater than the second distance value and less than or equal to the first distance value.

Correspondingly, the first preset condition may represent that the positional relationship between the mobile terminal and the wearable device satisfy the first preset distance range and is in a condition that an alarm operation can be triggered. Accordingly, the first operation instruction may be an instruction for controlling the mobile terminal to trigger the alarm operation.

The second preset condition may represent that the positional relationship between the mobile terminal and the wearable device satisfy the second preset distance range and is in a condition that the screen of the mobile phone is unlocked and lightened. Accordingly, the second operation instruction may be an operation instruction for controlling the mobile terminal to light up the screen of the mobile phone.

It is to be noted that the above-mentioned two operation instructions are exemplary, and other operation instructions may be used in actual process. However, the two operation instructions are different.

Figure 2:
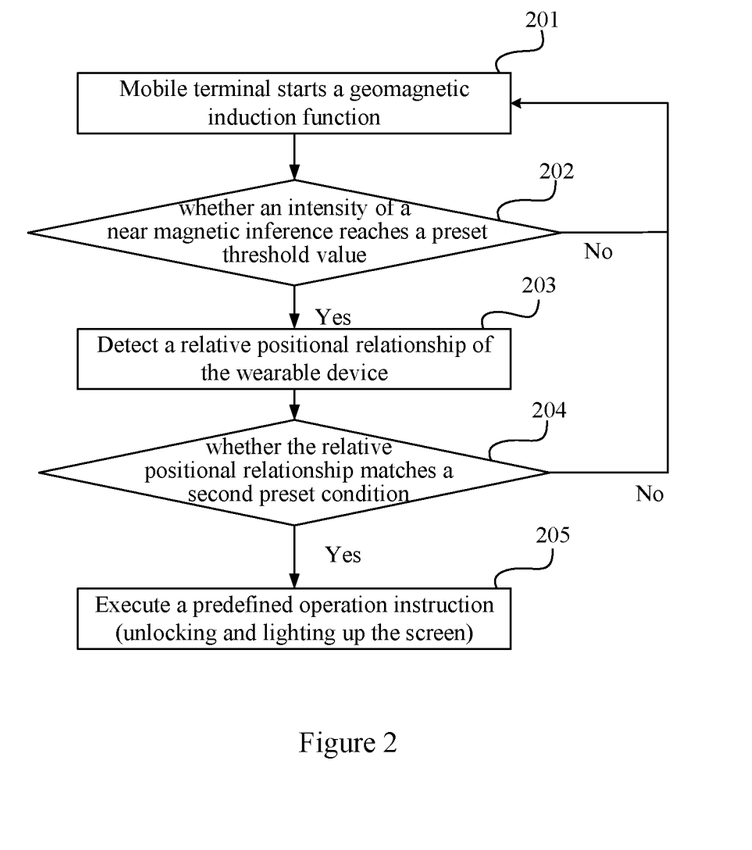
FIG. 2 is a second flowchart of a terminal-device control method according to an embodiment of the present disclosure.

The scenario in which the second preset condition is matched will be described hereinafter in conjunction with FIG. 2. Using the user with a wearable device (such as a watch) picking up the mobile terminal (such as a mobile phone) placed on the desk and lifting up to the face as an example, the process of the mobile phone automatically and immediately lightening and unlocking the screen is described. The process is simple, natural and safe, without requiring any participation of the user. As shown in FIG. 2, the method includes the steps described below.

In step 201, the mobile terminal starts a geomagnetic induction function.

In step 202, based on the intensity of the magnetic interference signal of the surrounding wearable device sensed by the geomagnetic sensor of the mobile terminal, it is determined whether the intensity of the magnetic interference signal of the wearable device reaches the preset threshold value. If the intensity of the magnetic interference signal reaches the preset threshold value, the process goes into step 203. If the intensity of the magnetic interference signal does not reach the preset threshold value, the process returns to an initial state of the step 201.

In step 203, the mobile terminal determines the positional relationship of the wearable device by using the intensity of the magnetic interference signal of the wearable device detected by the geomagnetic sensor. For example, the user picks up the mobile phone from the desk by using an arm with the match. The geomagnetic sensor detects the positional relationship.

In step 204, whether the positional relationship between the mobile terminal and the wearable device matches the second preset distance range corresponding to the second preset condition is determined. If the positional relationship matches the second preset distance range, the process goes into step 205. If the positional relationship does not match the second preset distance range, the process returns to the step 201.

In step 205, when the positional relationship between the mobile terminal and the wearable device satisfies the second preset condition, a predefined operation instruction corresponding to the second preset condition is executed. The predefined operation instruction may be lighting up and unlocking the screen of the mobile terminal.

When the mobile terminal detects that the positional relationship satisfies an approximate condition, that is, the scenario in which the positional relationship between the mobile terminal and the wearable device satisfies the second preset distance range as described above, the mobile terminal may be considered being picked up by the user for using. Alternatively, the mobile terminal may be picked up by the user for placing into a pocket or a bag. The mobile terminal is just picked up by the user from the desk but not prepared for using.

To further confirm whether the screen of the mobile terminal needs to be lighted up and unlocked at present to prevent an incorrect operation, the mobile terminal may start a distance sensor to detect a distance between the screen of the mobile terminal and an object opposite to the screen. Whether the distance reaches the second preset distance range is determined. If the distance reaches the second preset distance range, the process goes into the step 205.

The second preset distance range may be a proper second preset distance range preset by the manufacturer when the mobile terminal leaves the factory. The user may change the second preset distance range. When the distance sensor detects that the distance between the screen of the mobile terminal and the object opposite to the screen reaches the second preset distance range, the situation of the mobile terminal is considered to be suitable for lighting up the screen and unlocking the screen. Otherwise, the situation of the mobile terminal is considered to be not suitable for lighting up the screen and unlocking the screen.

For example, the mobile terminal is placed on the desk. When the user just picks up the mobile terminal for placing it into the pocket, but not for using, the mobile terminal is immediately subjected to a great near magnetic interference. In this case, a detection of the positional relationship between the mobile terminal and the wearable device is triggered. When the positional relationship satisfies the second preset distance range, a corresponding predefined strategy is selected, that is, the second preset condition and the operation instruction corresponding to the second preset condition.

In this case, the distance sensor detects that the distance between the screen of the mobile terminal and the object opposite to the screen is large, and the distance does not reach the preset threshold value. For example, a preset distance range is from 5 cm to 30 cm. However, the distance detected by the distance sensor is greater than 30 cm or less than 5 cm, indicating that the mobile terminal may just be picked up by the user or placed into the pocket. The situation of the mobile terminal is determined to be not suitable for lighting up the screen and unlocking the screen. Otherwise, the distance sensor detects that the distance between the screen of the mobile terminal and the object opposite to the screen reaches the threshold value, the situation of the mobile terminal is considered to be suitable for lighting up the screen and unlocking the screen. Accordingly, the distance detected by the distance sensor may be a distance between the screen of the mobile terminal and a part of the user's body opposite to the screen.

In this embodiment, when the mobile terminal is in a locked state, the mobile terminal detects whether a triggering condition for unlocking and lighting up the screen is satisfied by cooperating with the geomagnetic sensor and the positional relationship detection. When the mobile terminal is placed on the table and in the pocket of the user, the mobile terminal detects whether a certain near magnetic interference condition is satisfied by using the geomagnetic sensor. If a certain near magnetic interference condition is satisfied, whether the positional relationship is consistent or approximate is detected. If the positional relationship is approximate, the operation of unlocking the screen and lighting up the screen is executed. Compared with the related unlocking method, the unlocking process in this embodiment does not require the user to press buttons or click on the mobile terminal. The process of the unlocking the screen and lighting up the screen is imperceptible, and the unlocking mode is simple and intuitive. Compared with the related unlocking method, when the user wants to use the mobile terminal, the screen unlocking and lightening is achieved by picking up the mobile terminal and then the user may directly perform operations on the mobile terminal. The user does not need to light up the screen and deliberately press buttons or click on the mobile terminal to unlock the screen. The process of unlocking is imperceptible, and the unlocking mode is simple and intuitive.

It is to be noted that the detection of whether to light up the screen and unlock the screen by cooperating with the distance sensor in the above-mentioned steps is optional. In practice, the geomagnetic sensor may be used independently or the positional relationship detection may be used independently to determine whether the triggering condition for lighting up the screen and unlocking is satisfied.

Figure 3:
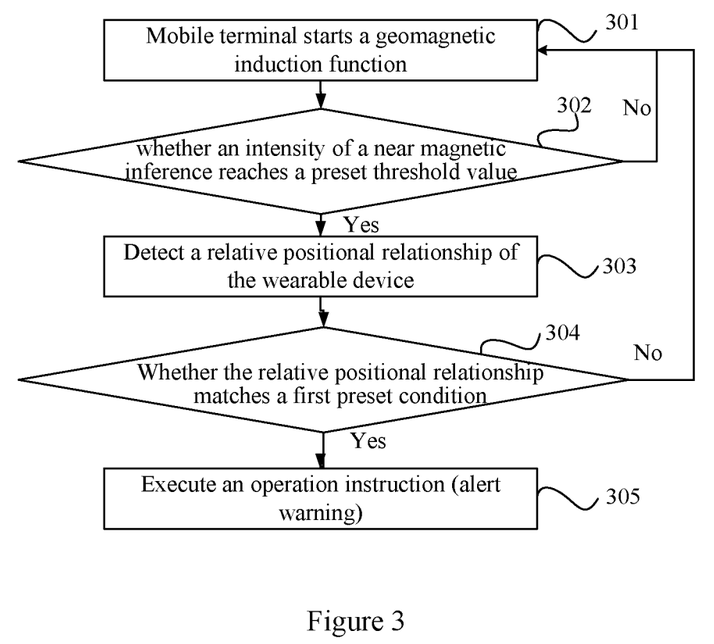
FIG. 3 is a third flowchart of a terminal-device control method according to an embodiment of the present disclosure.

In addition, a scenario in which the positional relationship between the mobile terminal and the wearable device satisfies the first preset condition corresponding to the first preset distance range is described in conjunction with FIG. 3. An example in which the mobile terminal (such as the mobile phone) in the pocket or the bag of the user with the wearable device (such as the bracelet) is taken by others is used, and the process of the mobile phone automatically and immediately reporting the alarm to guarantee the security of the mobile phone is described. As shown in FIG. 3, the method includes the steps described below.

In step 301, the mobile terminal starts the geomagnetic induction function.

In step 302, the geomagnetic sensor of the mobile terminal sense the intensity of the magnetic interference signal of the surrounding wearable device, determines whether the intensity of the magnetic interference signal of the wearable device reaches the preset threshold value. If the intensity of the magnetic interference signal of the wearable device reaches the preset threshold value, the process goes into step 303. If the intensity of the magnetic interference signal of the wearable device does not reach the preset threshold value, the process returns to the step 301.

In step 303, the mobile terminal detects the positional relationship of the wearable device by using the geomagnetic sensor. It is assumed that the mobile phone in the pocket of the user is taken by others, and the arm with the bracelet of the user is still, the current positional relationship is still. However, when the mobile phone is taken away the pocket, the geomagnetic sensor detects that the positional relationship between the bracelet and the mobile phone is changed and the distance is getting larger.

In step 304, whether the position relationship between the mobile terminal and the wearable device matches the first preset condition of the preset strategy is detected. If the position relationship between the mobile terminal and the wearable device matches the first preset condition, the process goes into step 305. If the position relationship between the mobile terminal and the wearable device does not match the first preset condition, the process returns to the step 301.

In step 305, when the position relationship between the mobile terminal and the wearable device satisfies the first preset condition of the preset strategy, a corresponding predefined operation instruction is executed. The predefined operation instruction may be the alarm operation for the mobile terminal. The alarm operation may be a sound alerting.

In this embodiment, when the position relationship between the mobile terminal and the wearable device satisfies the first preset condition, a predefined operation is executed. The predefined operation is the alarm operation for the mobile terminal.

The predefined operation may be set to be other operations by the user. For example, the predefined operation is set as changing a user right for the terminal. When the mobile phone is used by someone else, only functions with specific rights may be operated for protecting the privacy of the user.

When the mobile terminal leaves the factory, the proper first preset distance range is preset by the manufacturer, the user may change the first preset distance range according to requirements. When the position relationship between the mobile terminal and the wearable device satisfies the first preset distance range, the mobile terminal is considered to be not operated by the user, the mobile terminal executes the predefined operation. That is, the mobile terminal executes the operation instruction corresponding to the first preset condition. Otherwise, the situation of the mobile terminal is considered to be normal.

In this embodiment, when the mobile terminal is in the locked state. The mobile terminal detects by using the geomagnetic sensor whether the positional relationship satisfies the triggering condition for reporting an alarm. When the mobile terminal is placed on the desk or in the pocket of the user, whether a certain difference of the positional relationship between the mobile terminal and the wearable device exists is detected. If the difference satisfies a preset first preset distance range, it is considered that the mobile terminal is not operated by the user. An operation corresponding to the first preset condition is executed, such as reporting the alarm or configuring operation rights. Compared with the related art, this embodiment determines whether the user operates the mobile terminal by comparing the positional relationship between the wearable device such as the watch or a bracelet worn by the user and the mobile terminal, and has a higher safety and reliability.

Third Embodiment

Different from the second embodiment, this embodiment provides a scenario in which a corresponding preset condition is determined by a positional relationship between multiple wearable devices and a mobile terminal on the basis of first embodiment. This embodiment is described below.

The at least one wearable device includes a first wearable device and a second wearable device.

The step of selecting, according to the positional relationship between the mobile terminal and the at least one wearable device, a preset condition from a preset strategy, and determining a corresponding operation instruction based on the preset condition includes:

when the mobile terminal is in a first operation state, a positional relationship between the mobile terminal and the first wearable device maintains unchanged, and a positional relationship between the mobile terminal and the second wearable device satisfies a third preset distance range, the positional relationship between the mobile terminal and the at least one wearable device satisfying a third preset condition is determined.

Based on the third preset condition, a corresponding third operation instruction is determined. The third operation instruction is used for controlling the mobile terminal to switch from the first operation state to a second operation state.

Optionally, in the scenario provided by this embodiment, an initial state of the mobile phone may be a call state, may also be an audio output state, such as a state in which music is played.

In addition, the first operation state and the second operation state may be different states for the same configuration, such as a first audio output state or a second audio output state. That is, the first operation state and the second operation state may also switch from a state in which an output is performed by a handset to a state in which the output is performed by a speaker. In addition, two operation states may also be a first output state and a second output state. Optionally, the first output state in which the screen outputs with a first brightness is switched to the second output state in which the screen outputs with a second brightness.

Figure 4:
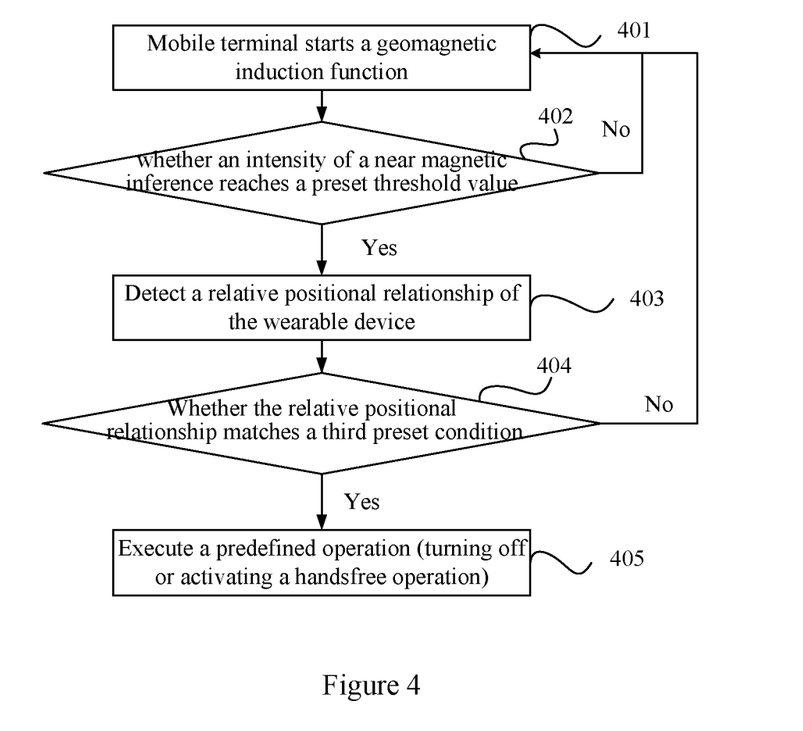
FIG. 4 is a fourth flowchart of a terminal-device control method according to an embodiment of the present disclosure.

A process of the mobile phone automatically activating a handsfree operation is described hereinafter in conjunction with FIG. 4 by using the user with the wearable device (such as a glasses and bracelet) calling with the mobile terminal (such as a mobile phone) as an example. The method includes steps described below.

In step 401, the mobile terminal starts a geomagnetic induction function.

In step 402, a geomagnetic sensor of the mobile terminal induces a magnetic field of the surrounding wearable device, and determines whether an intensity of a near magnetic inference reaches a preset threshold value. If the intensity of the near magnetic inference reaches a preset threshold value, the process goes into step 403. If the intensity of the near magnetic inference does not reach a preset threshold value, the process returns to the step 401.

In step 403, the mobile terminal detects the positional relationship of the wearable device by using the geomagnetic sensor. It is assumed that the user picks up the phone away from the ear and perform speech communication, the geomagnetic sensor of the mobile phone detects that the position relationship between the bracelet and the mobile phone maintains changed, but a distance between the mobile phone and the glasses changes, and the distance is getting greater.

In step 404, whether the position relationship between the mobile terminal and the wearable device matches the third preset condition is detected. If the position relationship between the mobile terminal and the wearable device matches the third preset condition, the process goes into step 405. If the position relationship between the mobile terminal and the wearable device does not match the third preset condition, the process returns to the step 401.

In step 405, when the position relationship between the mobile terminal and the wearable device satisfies the third preset distance range configured in the third preset condition, a predefined operation in an operation instruction corresponding to the third preset condition is executed. The predefined operation in this embodiment may activate a handsfree operation for the mobile terminal.

In this embodiment, the mobile terminal detects whether to activate or turn off the handsfree operation by using the geomagnetic sensor. When the mobile terminal is moved to an ear position from a hand-held using state of the user, the mobile terminal detects the positional relationship between the mobile phone and the bracelet is unchanged, but the distance between the mobile phone and the glasses is getting smaller by the geomagnetic sensor. When this preset condition is satisfied, the mobile terminal turns off the handsfree operation. When the mobile terminal is moved away the ear position from the hand-held using state of the user, the mobile terminal detects the positional relationship between the mobile phone and the bracelet is unchanged, but the distance between the mobile phone and the glasses is getting larger by the geomagnetic sensor. When this preset condition is satisfied, the mobile terminal activates the handsfree operation. Compared with the related art, this embodiment determines whether to turn off and activate the handsfree operation by comparing the positional relationship between the wearable device such as the watch or bracelet worn by the user and the mobile terminal, the manual operation of the user is saved and the whole process is more natural and simple.

Fourth Embodiment

Based on the scenario provided by the first embodiment, this embodiment provides a selection and process manner of a subsequent preset strategy according to a motion track formed by a positional relationship between the mobile terminal and the wearable device. This embodiment is described as follows.

The step of determining, based on the positional relationship, an operation instruction for the mobile terminal includes the steps described below.

Based on the positional relationship, the motion track of the at least one wearable device relative to the mobile terminal is determined.

Based on the motion track, a corresponding operation instruction is selected.

Based on the positional relationship, the motion track of the at least one wearable device relative to the mobile terminal is determined. Multiple positional relationships between the wearable device and the mobile terminal may be acquired in a preset time to form the motion track corresponding to the wearable device.

It is to be noted that the process of selecting the corresponding operation instruction based on the motion track may be: a preset motion track matching the motion track in a preset strategy is find based on the motion track, after the matched preset motion track is obtained, the corresponding operation instruction is determined according to the matched preset motion track. That is, the preset strategy may also include at least one preset motion track and the corresponding operation instruction corresponding to each preset motion track.

Figure 5:
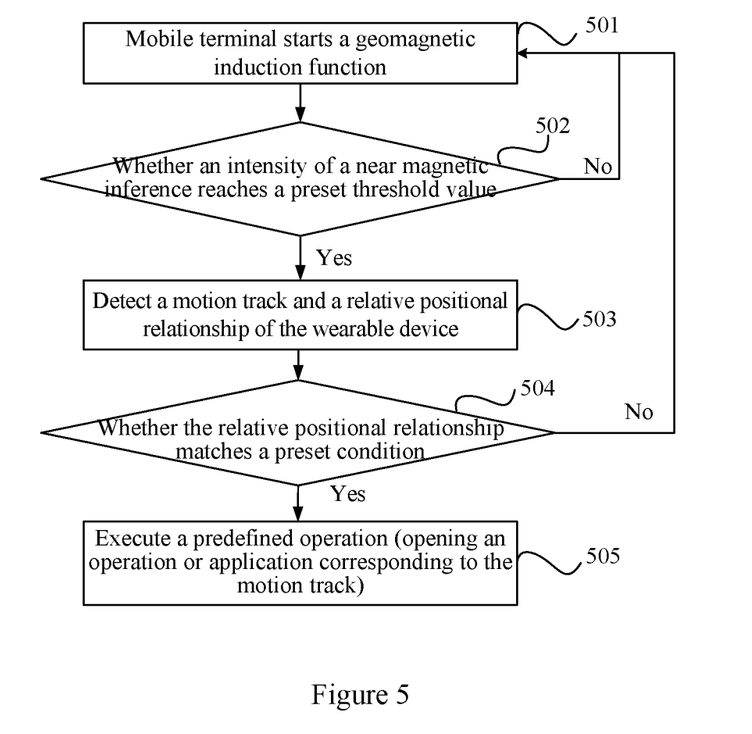
FIG. 5 is a fifth flowchart of a terminal-device control method according to an embodiment of the present disclosure.

This embodiment, using the user with the wearable device (such as a watch) turning on a certain application of the mobile terminal (such as a mobile phone) as an example, describes a process of the mobile phone turning on a certain application automatically. The process is simple, natural and safe, without tedious operations of the user. As shown in FIG. 5, the method includes the steps described below.

In step 501, the mobile terminal starts a geomagnetic induction function.

In step 502, a geomagnetic sensor of the mobile terminal senses a magnetic field of the surrounding wearable device, and determines whether an intensity of a near magnetic inference reaches a preset threshold value. If the intensity of the near magnetic inference reaches a preset threshold value, the process goes into step 503. If the intensity of the near magnetic inference does not reach a preset threshold value, the process returns to the step 501.

In step 503, the motion track between the wearable device and the mobile terminal is determined based on the positional relationship of the wearable device which is detected by the mobile terminal using the geomagnetic sensor. It is assumed that the user draws a horizontal motion track above the mobile phone, the geomagnetic sensor of the mobile phone detects that the position relationship of the bracelet and the mobile phone is changed, and the changing mode is a horizontal track. The user may execute any preset track above the mobile phone, such as drawing an arc or a cross, etc.

In step 504, whether the motion track matches any preset condition in the preset strategy is detected. If the motion track matches one preset condition in the preset strategy, the mobile terminal executes step 505. If motion track does not match any preset condition in the preset strategy, the method returns to the step 501.

In step 505, when the motion track satisfies the preset condition, the operation instruction corresponding to the preset condition is executed. A predefined operation instruction may be opening a certain predefined application or operation for the mobile terminal.

In this embodiment, the mobile terminal determines what kind of application the user is to open or what kind of operation to perform according to detection results of the geomagnetic sensor, and defines according to a predefined strategy. Compared with the related operation method, the operation method in this embodiment is executed by different motion tracks drew above the mobile phone, and is simple and safe without requiring the user to deliberately press buttons and click.

Fifth Embodiment

Figure 6:
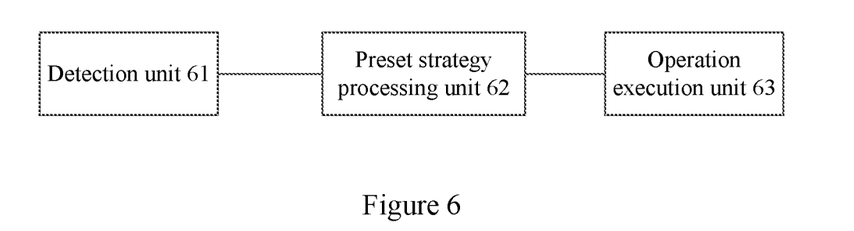
FIG. 6 is a structural diagram of a mobile terminal according to an embodiment of the present disclosure.

The embodiment of the present disclosure provides a mobile terminal, as shown in FIG. 6, including:

a detection unit 61, which is configured to detect a magnetic interference signal emitted by at least one wearable device, and determine, according to the magnetic interference signal, a magnetic interference variation caused by the at least one wearable device to the mobile terminal; determine, according to the magnetic interference variation caused by the at least one wearable device to the mobile terminal, a positional relationship between the mobile terminal and the at least one wearable device;

a preset strategy processing unit 62, which is configured to determine, according to the positional relationship, an operation instruction for the mobile terminal; and an operation execution unit 63, which is configured to control, based on the operation instruction, the mobile terminal to execute a corresponding operation.

The detection unit 61 is configured to detect an intensity of the magnetic interference signal which is emitted by the at least one wearable device and matches a preset pulse form.

The preset strategy processing unit 62 is configured to select, according to the positional relationship between the mobile terminal and the at least one wearable device, a preset condition from a preset strategy, and determine a corresponding operation instruction based on the preset condition. The preset strategy includes at least one preset condition, and an operation instruction corresponding to each preset condition. When the preset condition at least includes the operation instruction corresponding to a triggering, a distance between the mobile terminal and the at least one wearable device is within a preset distance range.

The preset strategy processing unit 62 is configured to determine, based on a first preset condition, a corresponding first operation instruction when the positional relationship between the mobile terminal and the at least one wearable device satisfies a first preset distance range; and determine, based on a second preset condition, a corresponding second operation instruction when the positional relationship between the mobile terminal and the at least one wearable device satisfies a second preset distance range.

A range value corresponding to the first preset distance range and a range value corresponding to the second preset distance range are different. The first preset condition and the second preset condition are different. The first operation instruction and the second operation instruction are different.

The preset strategy processing unit 62 is configured to determine that the positional relationship between the mobile terminal and the at least one wearable device satisfies a third preset condition, when the mobile terminal is in a first operation state, a positional relationship between the mobile terminal and the first wearable device maintains unchanged, and a positional relationship between the mobile terminal and the second wearable device satisfies a third preset distance range; and determine, based on the third preset condition, a corresponding third operation instruction.

The third operation instruction is used for controlling the mobile terminal to switch from first operation state to a second operation state.

The preset strategy processing unit 62 is configured to determine, based on the positional relationship, a motion track of the at least one wearable device relative to the mobile terminal; and select, based on the motion track, a corresponding operation instruction.

It can be seen that in the above-mentioned solution, the magnetic interference signal emitted by the at least one wearable device may be detected, the corresponding preset condition is selected from the preset strategy based on the magnetic interference signal, and the operation instruction is determined based on the preset condition, and finally the mobile terminal is controlled to execute the corresponding operation based on the operation instruction. In this way, the mobile terminal operation is more intelligent, the number of manual click operations of the users is reduced, and usage experience of the users is improved Sixth Embodiment The embodiment of the present disclosure provides a terminal-device control system, detailed with respect to FIG. 7. The system includes a mobile terminal 71 and at least one wearable device 72.

Figure 7:
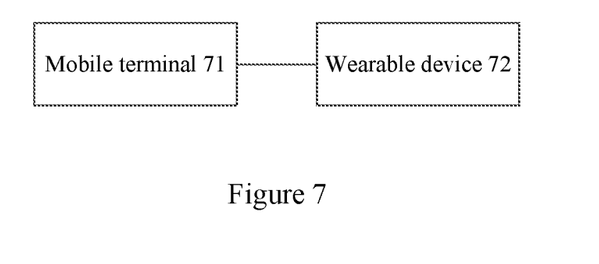
FIG. 7 is a first structural diagram of a system according to an embodiment of the present disclosure.

The at least one wearable device 72 is configured to emit a magnetic interference signal.

The mobile terminal 71 is configured to detect the magnetic interference signal emitted by the at least one wearable device, and determine, according to the magnetic interference signal, a magnetic interference variation caused by the at least one wearable device to a mobile terminal; determine, according to the magnetic interference variation of the at least one wearable device to the mobile terminal, a positional relationship between the mobile terminal and the at least one wearable device; determine, according to the positional relationship, an operation instruction for the mobile terminal; and control, based on the operation instruction, the mobile terminal to execute a corresponding operation.

Figure 8:
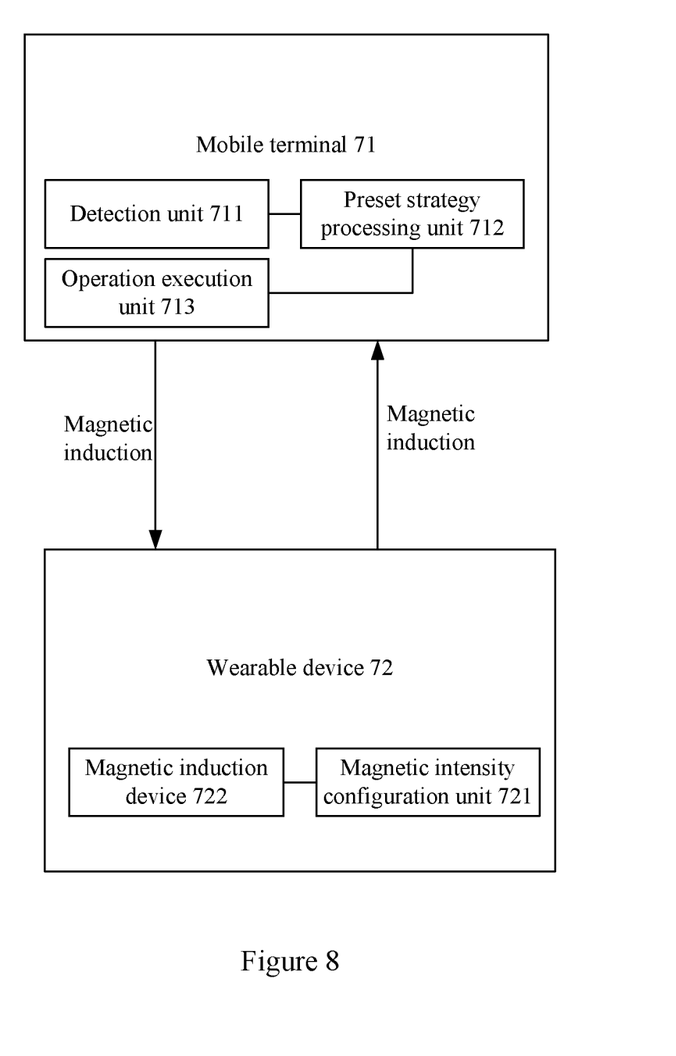
FIG. 8 is a second structural diagram of a system according to an embodiment of the present disclosure.

As shown in FIG. 8, the at least one wearable device 72 includes:

a magnetic intensity configuration unit 721, which is configured to configure an intensity of the magnetic interference signal; and a magnetic induction device 722, which is configured to emit a magnetic interference signal in a preset pulse form based on the intensity of the magnetic interference signal.

The mobile terminal 71 includes:

a detection unit 711, which is configured to detect the magnetic interference signal emitted by the at least one wearable device, and determine, according to the magnetic interference signal, the magnetic interference variation caused by the at least one wearable device to the mobile terminal; determine, according to the magnetic interference variation caused by the at least one wearable device to the mobile terminal, the positional relationship between the mobile terminal and the at least one wearable device;

a preset strategy processing unit 712, which is configured to determine, according to the positional relationship, the operation instruction for the mobile terminal; and an operation execution unit 713, which is configured to control, based on the operation instruction, the mobile terminal to execute the corresponding operation.

The detection unit 711, which is configured to turn on or turn off a magnetic induction triggering of the wearable device by a predefined configuration operation when the mobile terminal is in a certain state.

Optionally, the mobile terminal may be a mobile phone, a tablet PC or another portable terminal. When the mobile terminal is not in use, for example, when placed in a table, pocket, or bag and in a locked state, a low-power consumption geomagnetic field sensor built in the mobile terminal may be set as always working.

The detection unit 711 is configured to detect whether features matching a strategy exist. The mobile terminal may accept the features matching the strategy preset by the user. The preset condition may be a situation in which the position of the wearable device and the position of the mobile terminal are approximate or complete opposite.

The operation execution unit 713 is configured to execute the predefined operation when the positional relationship is detected satisfying the features matching the strategy.

The preset strategy processing unit 712 is configured to store a preset value or condition, and compare the preset value or condition with an actual detected value. When the mobile terminal leaves the factory, a proper positional relationship change threshold value is preset by the manufacturer. The user may change the threshold value according to requirements. Here, a preset threshold value represents the preset positional relationship change threshold value. A positional relationship change value may be a situation in which the position of the wearable device and the position of the mobile terminal are approximate or complete opposite.

It can be seen that in the above-mentioned solution, the magnetic interference signal emitted by the at least one wearable device may be detected, the corresponding preset condition is selected from the preset strategy based on the magnetic interference signal, and the operation instruction is determined based on the preset condition, and finally the mobile terminal is controlled to execute the corresponding operation based on the operation instruction. In this way, the mobile terminal operation is more intelligent, the number of manual click operations of the users is reduced, and usage experience of the users is improved An embodiment of the present disclosure further provides a computer-readable storage medium configured to store computer-executable instructions for implementing the above-mentioned terminal-device method when executed.

It is understandable by those skilled in the art that all or some steps in the method described above may be completed by relevant hardware (such as a processor) as instructed by programs, and the programs may be stored in a computer-readable storage medium, such as a read-only memory, a magnetic disk and an optical disk. Optionally, all or part of the steps in the embodiments described above may also be implemented by using one or more integrated circuits. Accordingly, the modules/units in the embodiments described above may be implemented by hardware. For example, the functions of these modules/units may be implemented by one or more integrated circuits. Alternatively, these modules/units may be implemented by software function modules. For example, the functions of these modules/units may be implemented by using a processor to execute program instructions stored in a storage medium. Embodiments of the present disclosure are not limited to any specific combination of hardware and software.

The above are only optional embodiments of the present disclosure and are not intended to limit the scope of the present disclosure.

INDUSTRIAL APPLICABILITY

A terminal-device control method, mobile terminal and system provided by embodiments of the present disclosure can make the mobile terminal operation more intelligent, reduce the number of manual click operations of the users, and improve usage experience of the users.

What is claimed is:

1. A terminal-device control method, comprising:
   detecting a magnetic interference signal emitted by at least one wearable device, and determining, according to the magnetic interference signal, a magnetic interference variation caused by the at least one wearable device to a mobile terminal;
   determining, according to the magnetic interference variation caused by the at least one wearable device to the mobile terminal, a positional relationship between the mobile terminal and the at least one wearable device;
   determining, according to the positional relationship, an operation instruction for the mobile terminal; and
   controlling, based on the operation instruction, the mobile terminal to execute a corresponding operation,
   wherein the method is performed by at least one hardware processor;
   wherein the determining, according to the positional relationship, the operation instruction for the mobile terminal comprises:
   selecting, according to the positional relationship between the mobile terminal and the at least one wearable device, a preset condition from a preset strategy, and determining a corresponding operation instruction based on the preset condition;
   wherein the preset strategy comprises at least one preset condition, and an operation instruction corresponding to each preset condition; and in response to determining that the at least one preset condition at least comprises the operation instruction corresponding to a triggering, a distance between the mobile terminal and the at least one wearable device is within a preset distance range.

2. The method according to claim 1, wherein the selecting, according to the positional relationship between the mobile terminal and the at least one wearable device, the preset condition from the preset strategy, and determining the corresponding operation instruction based on the preset condition comprises:
   determining, based on a first preset condition, a corresponding first operation instruction in response to determining that a distance between the mobile terminal and the at least one wearable device is within a first preset distance range;
   determining, based on a second preset condition, a corresponding second operation instruction in response to determining that the distance between the mobile terminal and the at least one wearable device is within a second preset distance range;
   wherein a range value corresponding to the first preset distance range and a range value corresponding to the second preset distance range are different; the first preset condition and the second preset condition are different; and the first operation instruction and the second operation instruction are different.

3. The method according to claim 1, wherein the at least one wearable device comprises a first wearable device and a second wearable device; the selecting, according to the positional relationship between the mobile terminal and the at least one wearable device, the preset condition from the preset strategy, and determining the corresponding operation instruction based on the preset condition comprises:
   determining that the positional relationship between the mobile terminal and the at least one wearable device satisfies a third preset condition, in response to determining that the mobile terminal is in a first operation state, a positional relationship between the mobile terminal and the first wearable device maintains unchanged, and a distance between the mobile terminal and the second wearable device is within a third preset distance range; and
   determining, based on the third preset condition, a corresponding third operation instruction; wherein the third operation instruction is used for controlling the mobile terminal to switch from the first operation state to a second operation state.

4. The method according to claim 1, wherein the determining, according to the positional relationship, the operation instruction for the mobile terminal comprises:
   determining, based on the positional relationship, a motion track of the at least one wearable device relative to the mobile terminal; and
   selecting, based on the motion track, a corresponding operation instruction.

5. The method according to claim 1, wherein the detecting a magnetic interference signal emitted by the at least one wearable device comprises:
   detecting a magnetic interference signal matching a preset pulse form emitted by the at least one wearable device.

6. A terminal-device control system, comprising a mobile terminal and at least one wearable device; wherein
   the at least one wearable device is configured to emit a magnetic interference signal;
   the mobile terminal is configured to:
      detect the magnetic interference signal emitted by the at least one wearable device, and determine, according to the magnetic interference signal, a magnetic interference variation caused by the at least one wearable device to the mobile terminal;
      determine, according to the magnetic interference variation caused by the at least one wearable device to the mobile terminal, a positional relationship between the mobile terminal and the at least one wearable device;
      determine, according to the positional relationship, an operation instruction for the mobile terminal; and
      control, based on the operation instruction, the mobile terminal to execute a corresponding operation;
   wherein the at least one wearable device comprises:
      a magnetic intensity regulator, which is configured to configure an intensity of the magnetic interference signal; and
      a magnetic interference signal generator, which is configured to emit the magnetic interference signal in a preset pulse form based on the intensity of the magnetic interference signal.

7. The system according to claim 6, wherein the mobile terminal is configured to:
   detect the magnetic interference signal emitted by the at least one wearable device, and determine, according to the magnetic interference signal, the magnetic interference variation caused by the at least one wearable device to the mobile terminal; determine, according to the magnetic interference variation caused by the at least one wearable device to the mobile terminal, the positional relationship between the mobile terminal and the at least one wearable device;
   determine, according to the positional relationship, the operation instruction for the mobile terminal; and
   control, based on the operation instruction, the mobile terminal to execute the corresponding operation.

8. A mobile terminal, comprising:
   a magnetic signal detector, configured to detect a magnetic interference signal emitted by at least one wearable device;
   a memory; and
   a processor communicably connected with the magnetic signal detector and the memory wherein the memory stores instructions executable by the processor, and execution of the instructions by the processor causes the processor to:
   determine, according to the magnetic interference signal, a magnetic interference variation caused by the at least one wearable device to the mobile terminal;
   determine a positional relationship between the mobile terminal and the at least one wearable device according to the magnetic interference variation;
   determine an operation instruction corresponding to the positional relationship; and
   execute an operation corresponding to the operation instruction;
   wherein the execution of the instructions by the processor further causes the processor to:
   select a preset condition from a preset strategy according to the positional relationship between the mobile terminal and the at least one wearable device; and
   determine the operation instruction based on the preset condition,
   wherein the preset strategy comprises at least one preset condition and at least one operation instruction each corresponding to a respective one of the at least one preset condition; and in response to determining that the at least one preset condition comprises the operation instruction corresponding to a triggering, a distance between the mobile terminal and the at least one wearable device is within a preset distance range.

9. The mobile terminal according to claim 8, wherein the execution of the instructions by the processor further causes the processor to:
   determine, based on a first preset condition, a corresponding first operation instruction in
   response to determining that a distance between the mobile terminal and the at least one wearable device is within a first preset distance range; and
   determine, based on a second preset condition, a corresponding second operation instruction in response to determining that the distance between the mobile terminal and the at least one wearable device is within a second preset distance range,
   wherein a range value corresponding to the first preset distance range and a range value corresponding to the second preset distance range are different, the first preset condition and the second preset condition are different, and the first operation instruction and the second operation instruction are different.

10. The mobile terminal according to claim 8, wherein the at least one wearable device comprises a first wearable device and a second wearable device, and the execution of the instructions by the processor further causes the processor to:
    determine that the positional relationship between the mobile terminal and the at least one wearable device satisfies a third preset condition, when the mobile terminal is in a first operation state, a positional relationship between the mobile terminal and the first wearable device maintains unchanged, and a distance between the mobile terminal and the second wearable device is within a third preset distance range; and
    determine, based on the third preset condition, a corresponding third operation instruction; wherein the third operation instruction is used for controlling the mobile terminal to switch from the first operation state to a second operation state.

11. The mobile terminal according to claim 8, wherein the execution of the instructions by the processor further causes the processor to:
    determine, based on the positional relationship, a motion track of the at least one wearable device relative to the mobile terminal; and
    select, based on the motion track, a corresponding operation instruction.

12. The mobile terminal according to claim 8, wherein the magnetic interference signal is a pulse in a preset form.

* * * * *